(12) United States Patent
Rabhi

(10) Patent No.: US 11,549,613 B2
(45) Date of Patent: Jan. 10, 2023

(54) VALVE PLATE WITH FREE MICRO-BALLS

(71) Applicant: Vianney Rabhi, Lyons (FR)

(72) Inventor: Vianney Rabhi, Lyons (FR)

(*) Notice: Subject to any disclaimer, the term of this patent is extended or adjusted under 35 U.S.C. 154(b) by 0 days.

(21) Appl. No.: 17/494,332

(22) Filed: Oct. 5, 2021

(65) Prior Publication Data

US 2022/0107035 A1 Apr. 7, 2022

Related U.S. Application Data

(60) Provisional application No. 63/088,173, filed on Oct. 6, 2020.

(51) Int. Cl.
*F16K 15/04* (2006.01)
*F16K 99/00* (2006.01)

(52) U.S. Cl.
CPC ...... *F16K 99/0023* (2013.01); *F16K 99/0057* (2013.01); *F16K 15/04* (2013.01); *F16K 2099/0094* (2013.01)

(58) Field of Classification Search
CPC ............ F16K 99/0023; F16K 99/0057; F16K 2099/0094; F16K 15/04
USPC ..................................... 137/512, 533.11, 366
See application file for complete search history.

(56) References Cited

U.S. PATENT DOCUMENTS

| | | | | |
|---|---|---|---|---|
| 2,278,715 A * | 4/1942 | Stoyke | ..................... | F16K 15/04 137/533.13 |
| 2,296,135 A * | 9/1942 | Batson | ..................... | F16K 15/04 137/515 |
| 2,578,069 A * | 12/1951 | Jones | ..................... | F16K 15/04 137/533.15 |
| 2,891,571 A * | 6/1959 | Sparks | .................. | F16K 15/042 137/512.1 |
| 4,018,247 A * | 4/1977 | Carr | ..................... | F16K 15/042 137/512.1 |
| 4,100,935 A * | 7/1978 | Harnish | .................. | F16K 15/04 137/533.19 |
| 4,346,731 A * | 8/1982 | Sigworth, Jr. | ........ | F16K 31/002 137/433 |
| 4,413,615 A * | 11/1983 | Sigworth, Jr. | .......... | F24S 40/50 137/433 |
| 4,568,337 A * | 2/1986 | Treharne, III | ........ | A61F 11/202 604/9 |
| 5,232,014 A * | 8/1993 | Hiltebrand | .......... | F16K 27/0245 137/533.15 |

(Continued)

FOREIGN PATENT DOCUMENTS

FR 3 061 743 7/2018

*Primary Examiner* — Minh Q Le
(74) *Attorney, Agent, or Firm* — Nixon & Vanderhye

(57) ABSTRACT

The valve plate (1) with free micro-balls allows a fluid (2) to flow from an upstream volume (3) to a downstream volume (4) and not in the reverse direction, and comprises a circulation plate (5) crossed through by a circulation orifice (6) terminated by a micro-ball seat (7), a permeable guide plate (9) parallel to said plate (5) being crossed through by a guide cylindrical orifice (10) which houses a micro-ball (8) which rests on said seat (7) so as to close said orifice (6) or rests on a permeable micro-ball stop abutment (11), a spacer (12) being interposed between said plate (9) and said plate (5), a discharge passageway (13) crossing through said plate (9) to allow the fluid (2) to flow when the micro-ball (8) does not rest on said seat (7).

7 Claims, 11 Drawing Sheets

(56) References Cited

U.S. PATENT DOCUMENTS

| | | | | |
|---|---|---|---|---|
| 5,593,292 | A * | 1/1997 | Ivey | F04B 53/101 |
| | | | | 137/533.15 |
| 6,035,890 | A * | 3/2000 | Massicotte | F16K 15/04 |
| | | | | 137/533.13 |
| 6,508,269 | B2 * | 1/2003 | Szabo | F16L 37/407 |
| | | | | 137/515.5 |
| 6,615,760 | B1 * | 9/2003 | Wise | F16K 15/04 |
| | | | | 114/197 |
| 6,684,415 | B1 * | 2/2004 | Kozono | E03C 1/1225 |
| | | | | 137/512 |
| 6,685,451 | B1 * | 2/2004 | Ivey | F04B 53/126 |
| | | | | 137/533.19 |
| 6,899,127 | B1 * | 5/2005 | Swingley | F16K 15/04 |
| | | | | 137/533.15 |
| 10,184,314 | B1 * | 1/2019 | Bair | E21B 34/06 |
| 11,091,980 | B2 * | 8/2021 | Stachowiak, Jr. | F04B 53/1007 |
| 11,125,349 | B1 * | 9/2021 | Samayamantula | E21B 34/08 |
| 2003/0127140 | A1 * | 7/2003 | Warlick | F16K 15/04 |
| | | | | 137/533.11 |
| 2007/0215217 | A1 * | 9/2007 | Goodhope | F16K 47/10 |
| | | | | 137/512.1 |
| 2015/0308578 | A1 * | 10/2015 | Block, III | F04B 43/0072 |
| | | | | 137/625.48 |
| 2018/0246072 | A1 * | 8/2018 | Steinke | G01N 30/20 |
| 2018/0274659 | A1 * | 9/2018 | Iizuka | F16K 15/1823 |
| 2019/0120397 | A1 * | 4/2019 | Baer | F16K 15/04 |

\* cited by examiner

[Fig. 1]
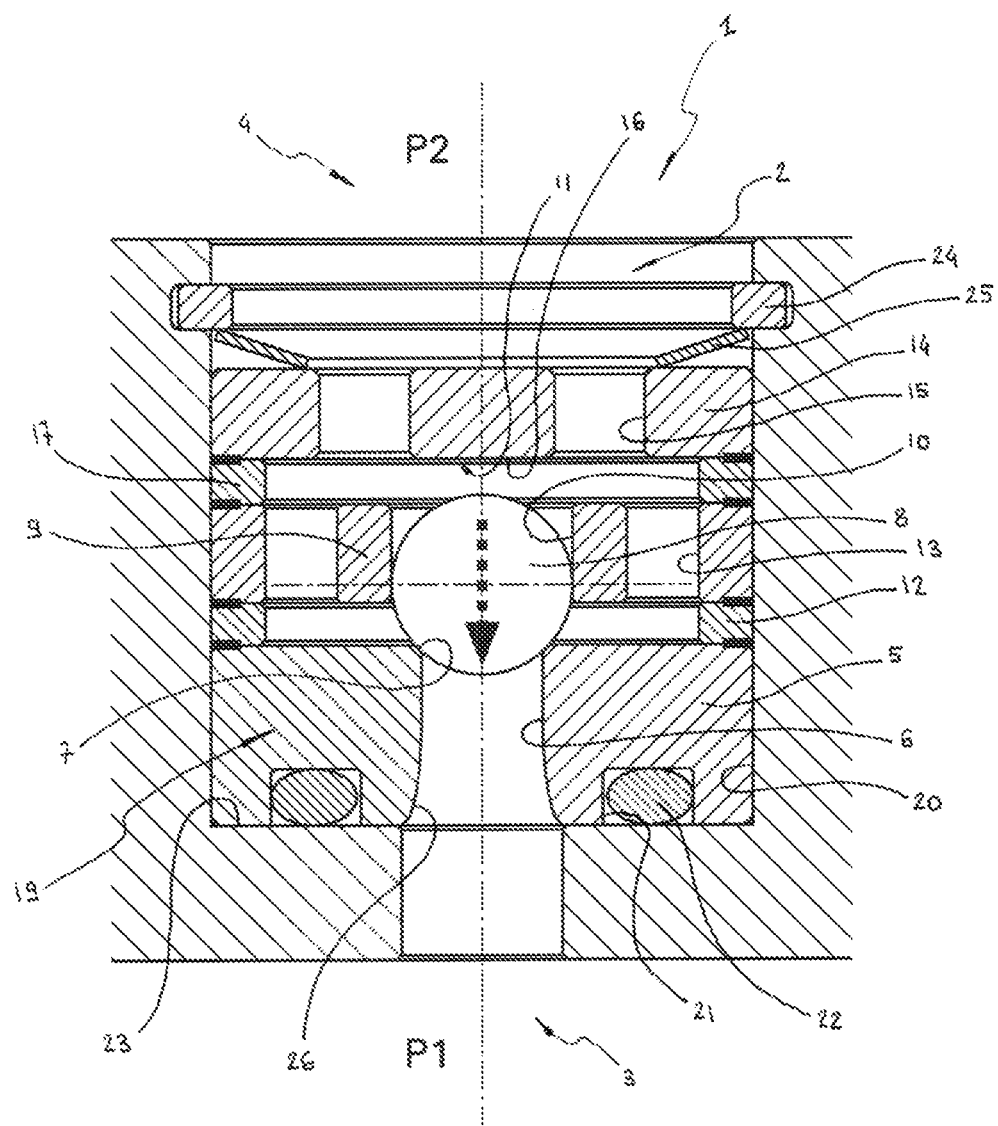

[Fig. 2]
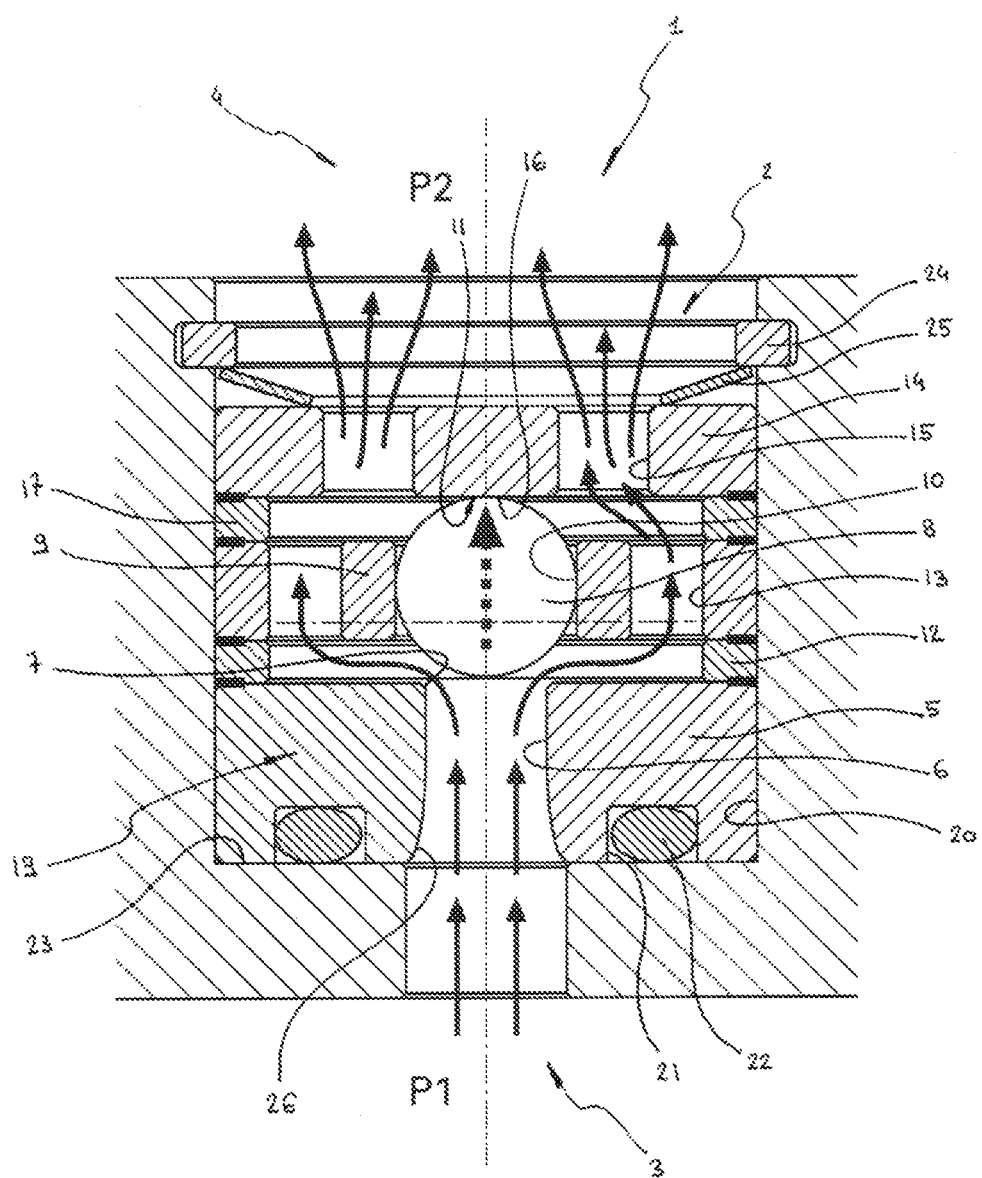

[Fig. 3]
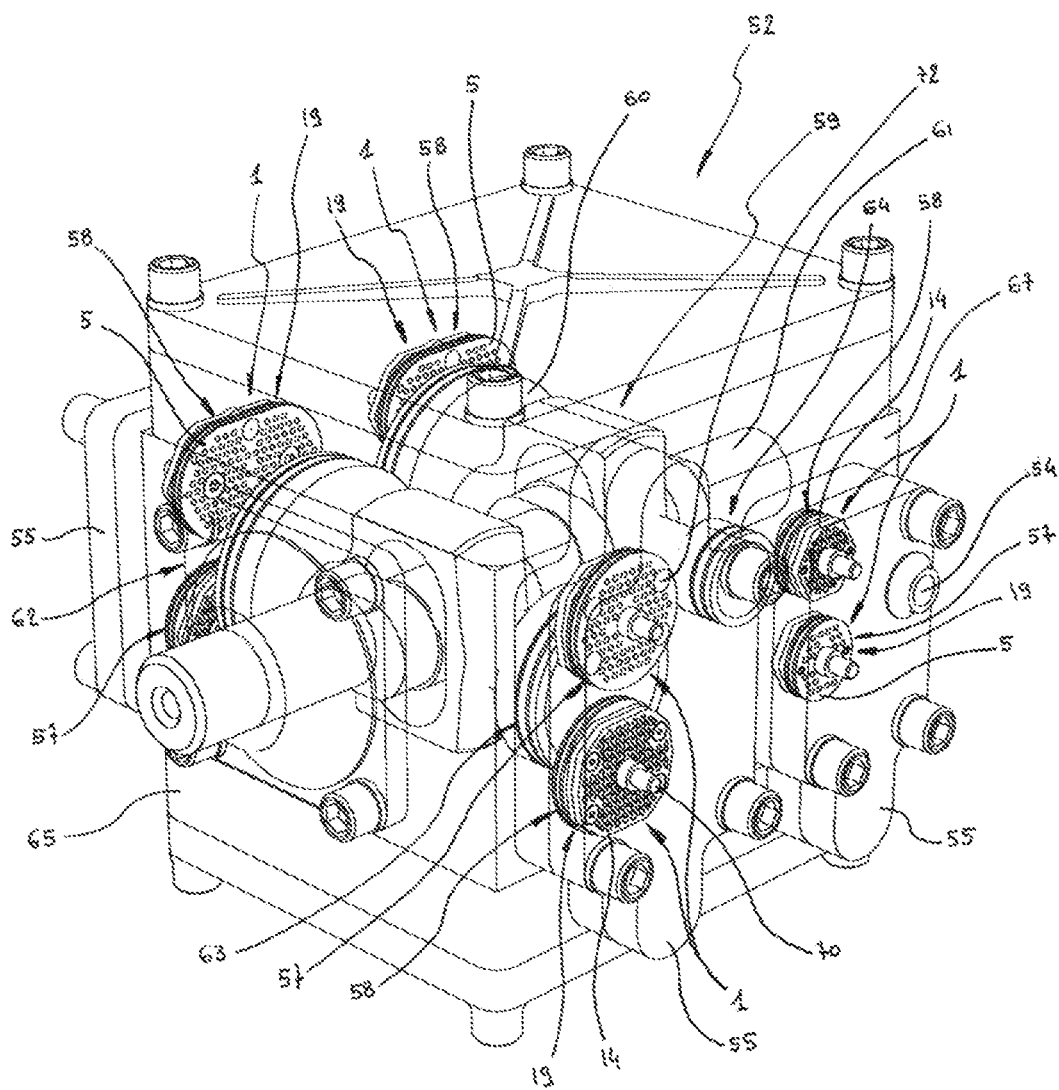

[Fig. 4]
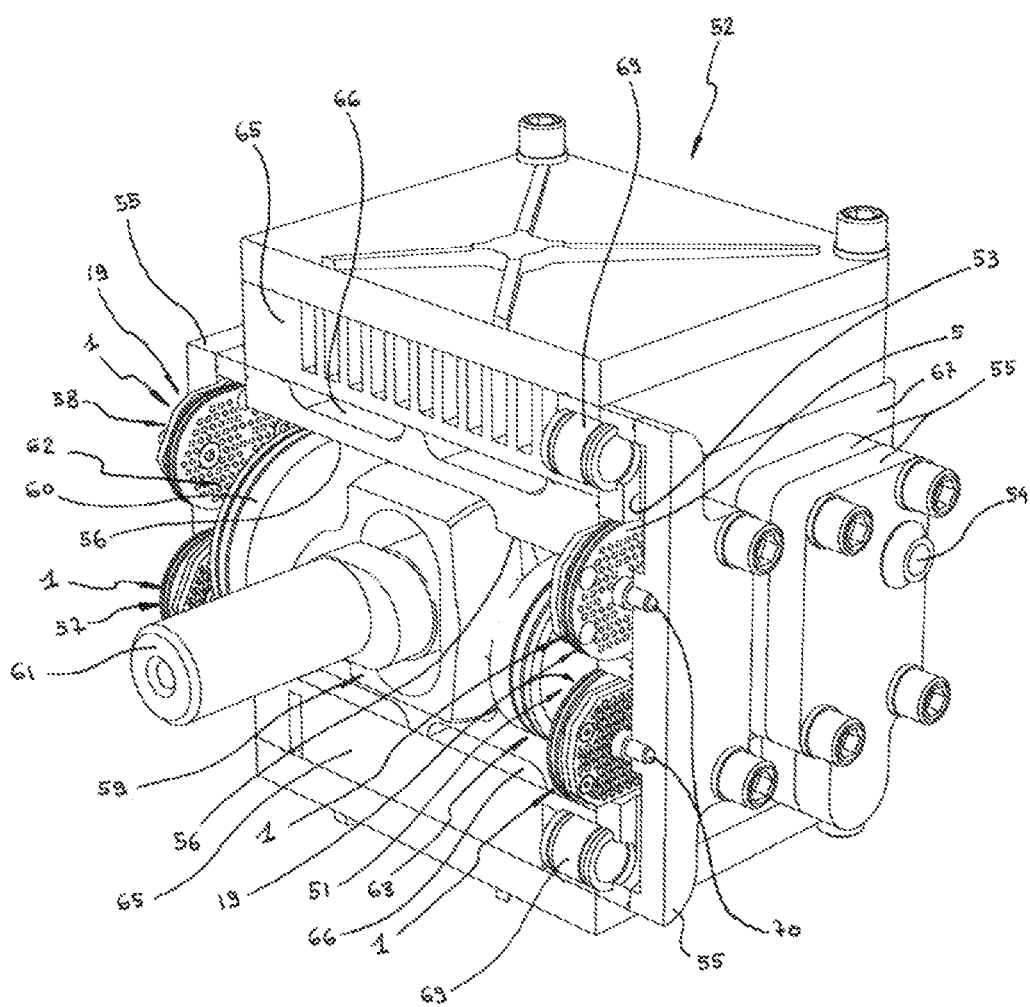

[Fig. 5]
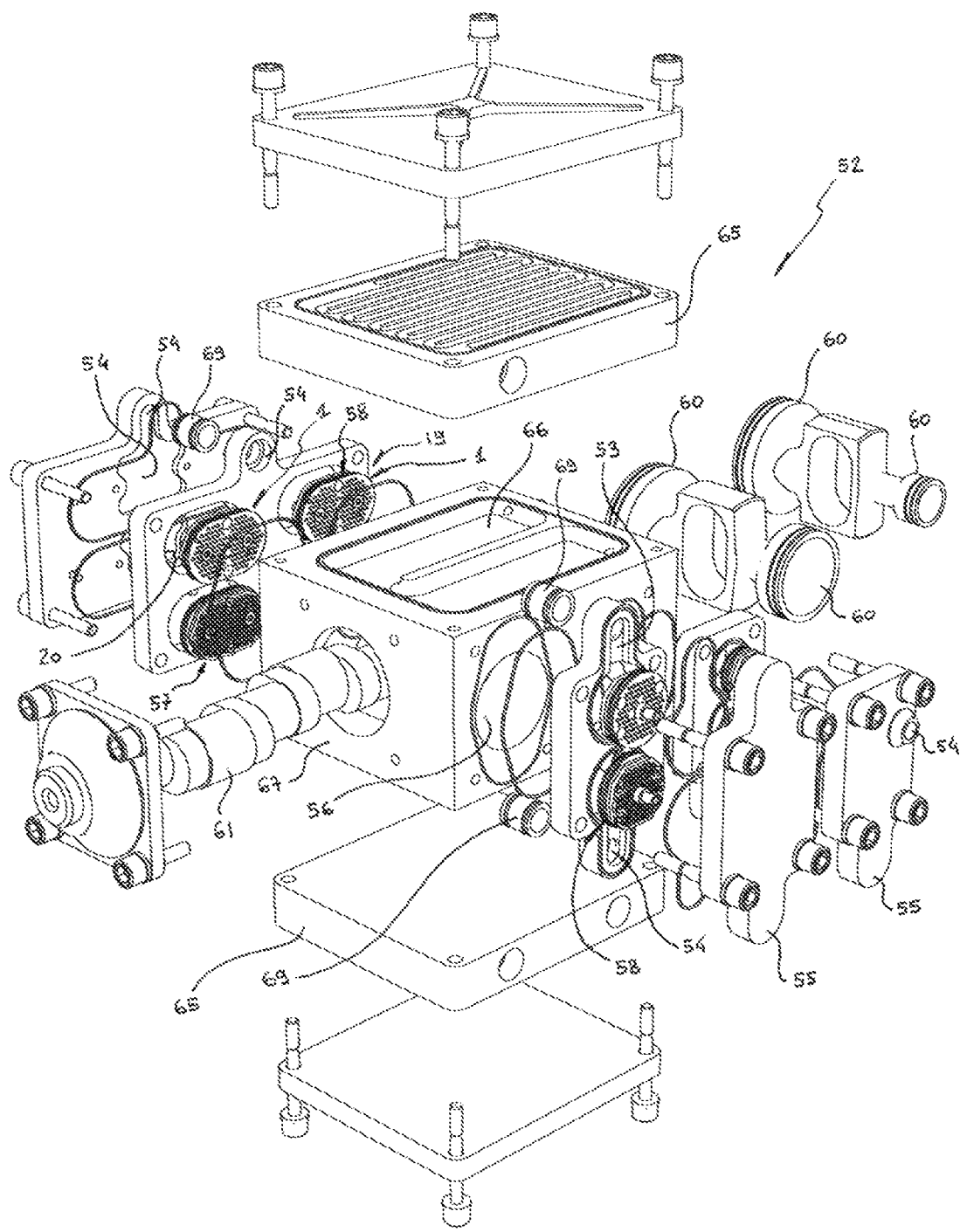

[Fig. 6]
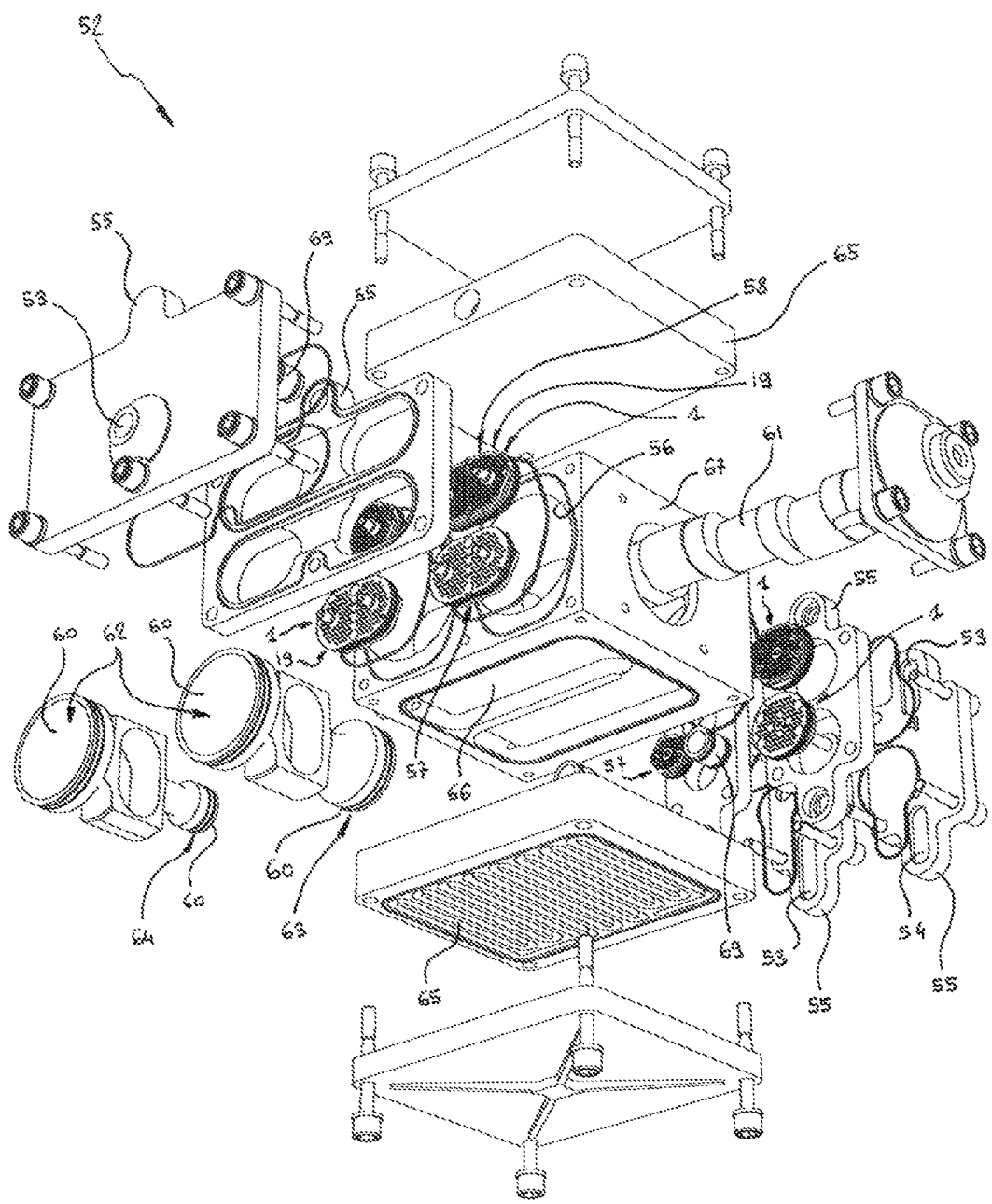

[Fig. 7]
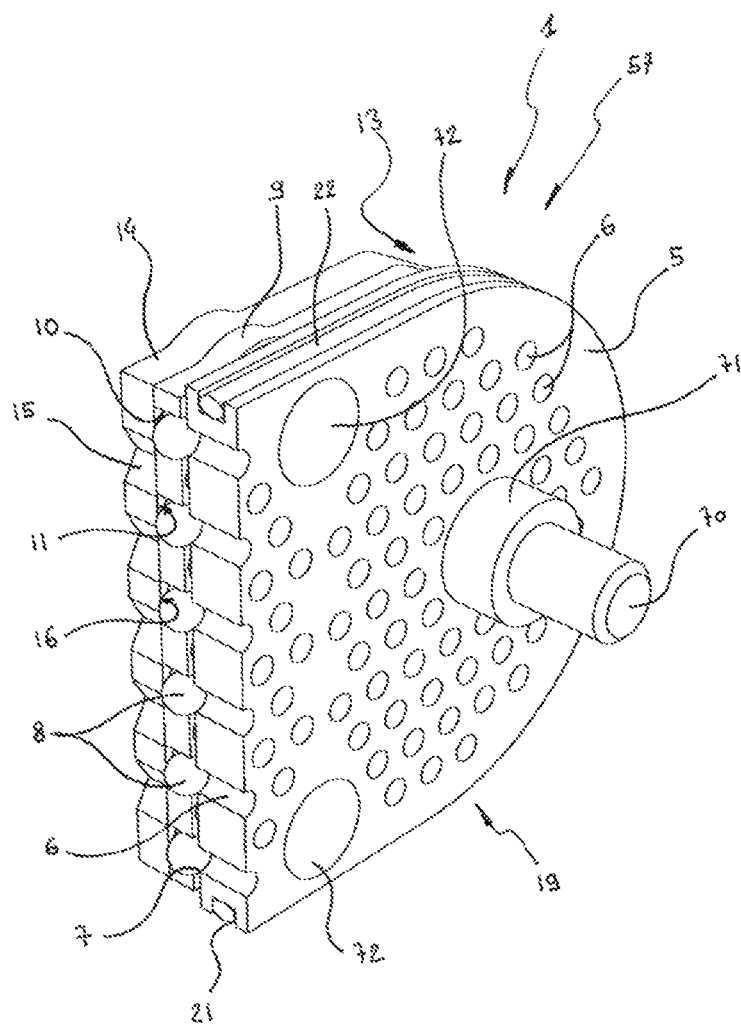

[Fig. 8]
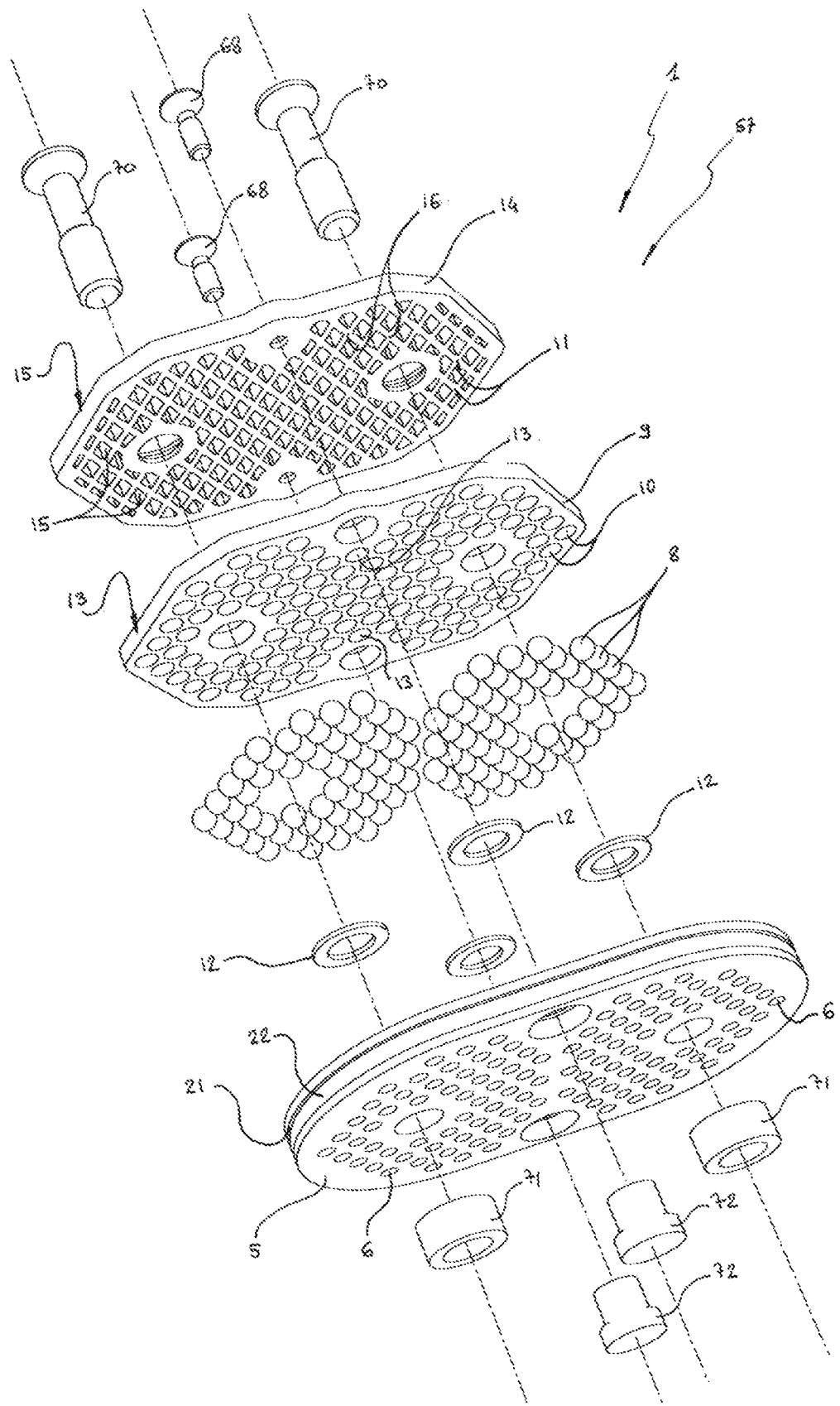

[Fig. 9]
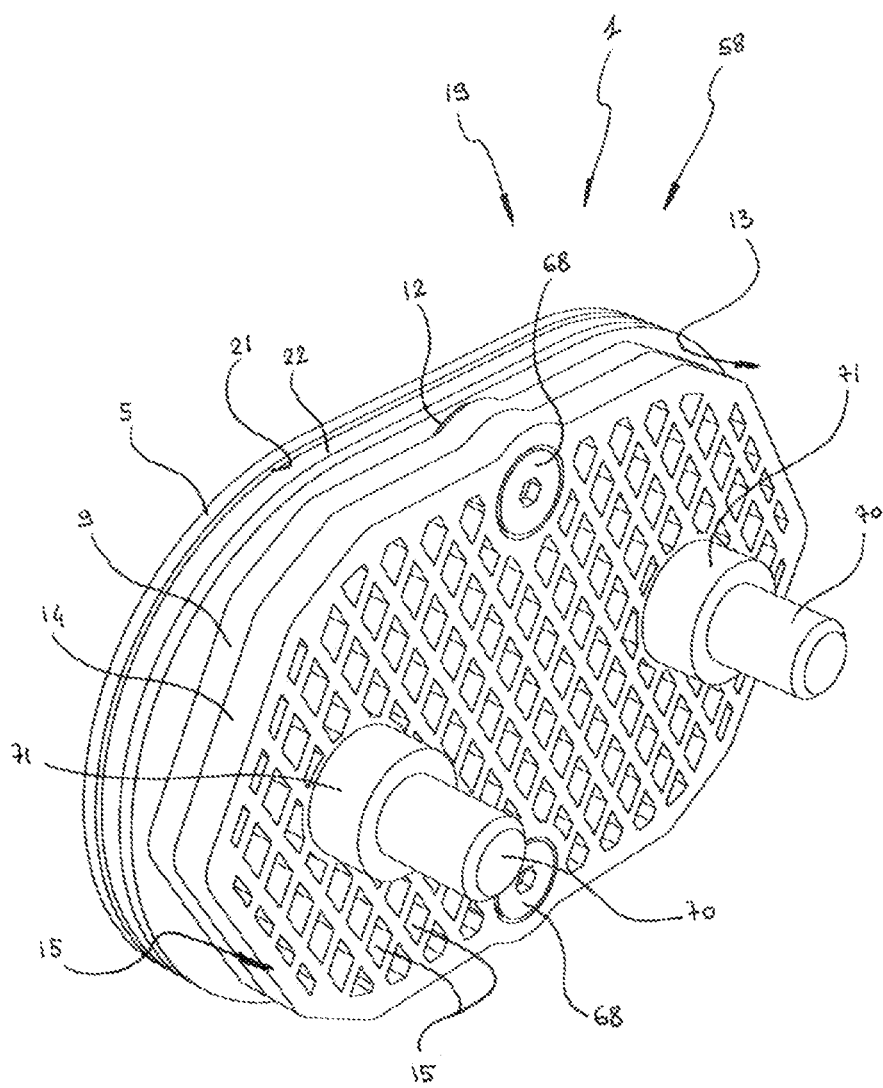

[Fig. 10]
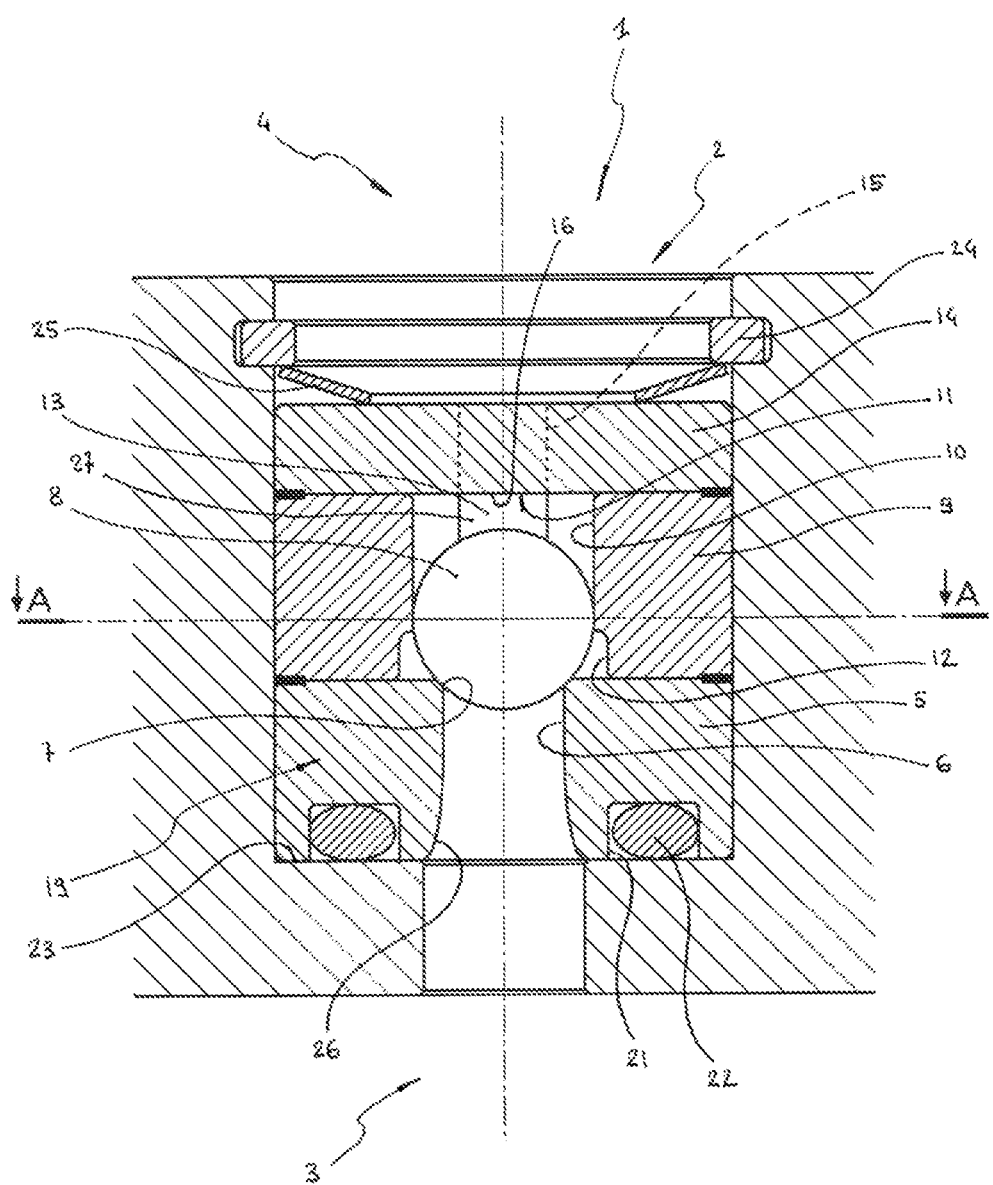

[Fig. 11]
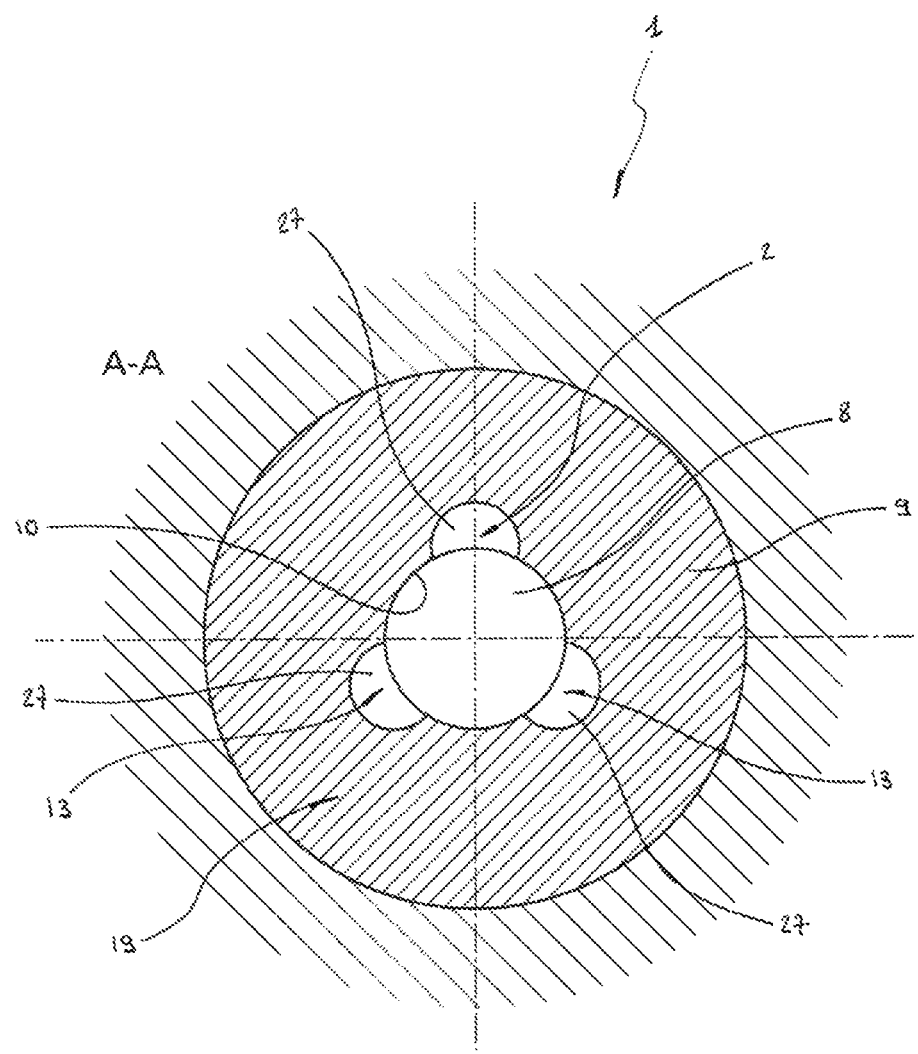

VALVE PLATE WITH FREE MICRO-BALLS

The present invention relates to a valve plate with free micro-balls, which is mainly intended to allow the filling and/or emptying of any cylinder of any reciprocating compressor or any reciprocating pump whatsoever, whether said compressor or said pump is of the piston-type, of the diaphragm-type or of any kind of volume variation device known to those skilled in the art.

There are many types of compressor valves or so-called "passive" pump valves, i.e. whose opening and closing are controlled by the pressure difference between an upstream volume and a downstream volume between which they are interposed. Passive valves are therefore to be distinguished from so-called "piloted" valves, the opening and closing of which are activated by an actuator.

Passive compressor valves can in particular be of the lamellar, plate, or concentric segments type. They can also take the form of "poppet valves" like those produced by the "Burckhardt" company and consist of micro-valves each cooperating with a return spring.

The "Magnum™ HammerHead™ valves" are also to be noted, which are "poppet valves" marketed by the company "Dresser-Rand" specially adapted to compressors of heavy molecules such as carbon dioxide, ethylene, propane or natural gas.

Passive compressor valves can be metallic or non-metallic. For example, the "Hoerbiger" company produces valves in "PEEK" also called "Polyetheretherketone" which is a material offering in particular advantageous anti-abrasive properties.

The optimum performance of the inlet and outlet valves of piston compressors according to the state of the art is usually found at a determined compressor rotational speed.

Indeed, said valves constitute a mass-spring assembly provided with a natural frequency. As such, they are designed to operate under relatively precise speed or even load conditions of the compressor that they equip.

Indeed, if said compressor operates at a speed too far from the optimum speed of the passive valves that comprises said compressor, the energy efficiency of said valves is degraded, as well as their durability.

In terms of energy, passive valves are expected to have the best possible permeability to provide the compressor that they equip with the best possible volumetric efficiency, i.e. the best propensity to fill and empty its cylinder.

A high permeability of the valves limits the energy losses by pumping the compressor they equip. This applies to the valves located at the inlet of said compressor as well as to those located at the outlet of the latter.

To serve this objective, the passive compressor valves must open from the smallest pressure difference existing between the upstream volume and the downstream volume between which they are interposed, then, once opened, oppose the less possible to the passage of gases.

In addition, once the gases are admitted or discharged, said valves must close again as quickly as possible so as to limit the flow of gases in the reversed direction, this undesirable effect being known by the Anglo-Saxon term of "back-flow".

Passive compressor valves generally include a spring which returns them on their seat.

Said spring comes out of a compromise.

Ideally, the force exerted by this spring on the valve with which it cooperates should be low enough so that firstly, the gases could open said valve under a low differential pressure, and secondly, so as not to excessively laminate said gases passing through said valve, the lamination forming an irrecoverable energy loss.

Simultaneously, said spring must be firm enough to return the valve to its seat quickly when the pressure difference is reversed, in order to limit the "back-flow" and obtain the best possible volumetric efficiency of the compressor.

In addition to being as energy efficient as possible, passive compressor valves must remain durable, suitably tight, low in maintenance, inexpensive to produce, maintain and repair, and wherever possible, silent.

The main sources of wear of valves according to the state of the art exist at the contacts between the valve and its seat, between the valve and its opening stop, between the return spring and the valve, and between the return spring and its housing.

The wear of the valves is generally more important when they operate in aggressive chemical and/or particulate conditions. In addition, the fouling of said valves can lead to degrading the tightness and/or the permeability thereof.

The valves according to the state of the art can also be damaged by cracking, by deformation, or even by rupture. They generally age due to abrasion, creep, pitting or surface chipping.

Passive compressor valves according to the state of the art are therefore poorly suited to the production of a compressor such as that necessary for the implementation of the ignition prechamber with valve object of patent No. FR 3,061,743 published on Aug. 16, 2019 and belonging to the applicant.

Indeed, the compressor required by said prechamber for its supply of pilot load must be capable to operate over a wide range of rotational speed which characterizes the operation of reciprocating automotive internal combustion engines, and over an extended range of pressure and temperature.

In addition, the compressor necessary for supplying the ignition prechamber with valve according to patent No. FR 3,061,743 must be capable to operate throughout the service time of an automobile without repair or maintenance, this despite significant variations in the operating conditions to which it is subjected.

In this context, passive compressor valves according to the state of the art make it difficult to achieve a feed compressor suitable for said ignition prechamber with valve.

This is why, particularly in the context of the implementation of said prechamber, the valve plate with free microballs according to the invention advantageously replaces the passive compressor valves according to the state of the art in that, according to a particular embodiment:

- It is particularly permeable so that it offers little resistance to the passage of gases, which favors the energy efficiency of the compressor which is equipped with it;
- It is reactive and its switching between open and closed position is done under a very low differential pressure, which also favors the energy efficiency of the compressor which is equipped with it;
- It can operate over a wide range of frequencies, and in particular it allows any compressor equipped with it to operate at variable speed, for example to implement the ignition prechamber with valve according to patent No. FR 3,061,743 on an automotive combustion engine;
- It is durable and allows a cumulative operation over several thousand hours without maintenance, which makes it compatible with automotive applications, and reduces the maintenance charges of reciprocating compressors in general;

It is robust, self-cleaning and can cope with aggressive environments or traces of lubricant without affecting its efficiency;

It can operate over a wide temperature range without risk of deformation or loss of performance;

It is inexpensive to produce.

The valve plate with free micro-balls according to the invention can indeed be applied to the ignition prechamber with valve according to patent FR 3,061,743. However, the valve plate with free micro-balls according to the invention can also be used for any other application, of any type or in any field, which requires a gas or liquid to pass from an upstream volume to a downstream volume, but not in the reversed direction, and this, whatever the nature of said gas, liquid or volumes.

The valve plate with free micro-balls according to the present invention separates an upstream volume from a downstream volume, and allows a fluid to flow from said upstream volume to said downstream volume but not in the reversed direction, said valve plate comprising:

- At least one fixed circulation plate which sealingly separates the upstream volume from the downstream volume, said plate being crossed right through in the direction of its thickness by at least one circulation orifice in which the fluid can flow, wherein the end of that orifice which emerges in the downstream volume has a micro-ball seat;
- At least one permeable guide plate fixedly accommodated in the downstream volume parallel to the circulation plate and close to the latter, said plate being crossed right through in the direction of its thickness by at least one guide cylindrical orifice, the longitudinal axis of which being centred on that of the micro-ball seat;
- At least one micro-ball accommodated with small play inside the guide cylindrical orifice, said small play limiting the passage of fluid through the gap left between said micro-ball and said cylindrical orifice, said micro-ball being capable to move in translation longitudinally in said cylindrical orifice so as to either sealingly rest on the micro-ball seat in order to close the circulation orifice and to prohibit the flow of the fluid in said orifice, or be distant from said seat to allow said fluid flow through said orifice;
- At least one permeable micro-ball stop abutment that is directly or indirectly attached to the guide cylindrical orifice and that sets the maximum distance between the micro-ball and the micro-ball seat when said micro-ball is in contact with said abutment, the latter closing only little or not the guide cylindrical orifice;
- At least one spacer interposed between the permeable guide plate and the circulation plate so as to keep said plate at a distance from said plate such that when the micro-ball is in contact with the micro-ball seat, at least part of the volume of said micro-ball remains accommodated inside the guide cylindrical orifice, while when said micro-ball is in contact with the micro-ball stop abutment, a passage is left for the fluid to flow on the one hand, between said micro-ball and the micro-ball seat with which it cooperates and, on the other hand, between the permeable guide plate and the circulation plate;
- At least one discharge passage which passes right through the permeable guide plate and/or which bypasses said plate, said passage allowing, when the micro-ball is not resting on the micro-ball seat, the fluid to flow from the upstream volume to the downstream volume via the circulation orifice.

The valve plate with free micro-balls according to the present invention comprises a permeable micro-ball stop abutment which consists of a micro-ball bearing area which is positioned in the extension of the guide cylindrical orifice and which is arranged on a stopper plate fixedly housed in the downstream volume parallel to the permeable guide plate and close to the latter, a discharge passageway passing right through the stopper plate in the direction of its thickness and/or bypasses the stopper plate to allow fluid to flow from the upstream volume to the downstream volume through the circulation orifice when the micro-ball is not resting on the micro-ball seat.

The valve plate with free micro-balls according to the present invention comprises a stopper plate spacer which is interposed between the stopper plate and the permeable guide plate so as to keep said stopper plate at a distance from said plate such that when the micro-ball is in contact with the micro-ball bearing area, at least part of the volume of said micro-ball remains accommodated inside the guide cylindrical orifice.

The valve plate with free micro-balls according to the present invention comprises a circulation plate, a permeable guide plate, a permeable micro-ball stop abutment and a spacer which constitute a rigid assembly in which the micro-ball is housed.

The valve plate with free micro-balls according to the present invention comprises a rigid assembly that is sealingly housed in an assembly recess which separates the upstream volume from the downstream volume.

The valve plate with free micro-balls according to the present invention comprises an assembly recess which has an upstream volume-side axial stop abutment on which the rigid assembly rests directly, and a downstream volume-side axial stop abutment on which the rigid assembly rests via an assembly-holding spring, the latter bearing on the downstream volume-side axial stop abutment in order to press the assembly recess against the upstream volume-side axial stop abutment.

The valve plate with free micro-balls according to the present invention comprises a discharge passageway which is formed by at least one axial discharge groove arranged in the internal wall of the guide cylindrical orifice.

The following description of the invention, together with the attached drawings, which are provided as non-limiting examples, will provide a better understanding of the invention, the characteristics thereof, and the advantages it is capable of providing:

FIG. 1 is a schematic cross-sectional view of the valve plate with free micro-balls according to the invention and according to a simple variant comprising only one micro-ball, in order to facilitate understanding of the operation of said valve plate, the pressure prevailing in the downstream volume being greater than the pressure prevailing in the upstream volume.

FIG. 2 is a schematic cross-sectional view of the valve plate with free micro-balls according to the invention and according to the configuration illustrated in FIG. 1, the pressure prevailing in the upstream volume being greater than the pressure prevailing in the downstream volume.

FIG. 3 is a three-dimensional phantom view of a three-stage reciprocating piston compressor with air-water intercoolers, the movable coupling of said compressor forming a crank-frame system, each compression stage of said compressor receiving at least one valve plate with free micro-balls according to the invention as inlet valve, and at least one valve plate with free micro-balls according to the invention as outlet valve.

FIG. 4 is a three-dimensional cross-sectional view of the reciprocating piston compressor shown in FIG. 3, this view evidencing in particular the inlet and discharge ducts arranged in the compressor heads, said ducts each being opposite a valve plate with free micro-balls according to the invention.

FIG. 5 is a three-dimensional exploded view of the reciprocating piston compressor shown in FIG. 3, this view evidencing how the valve plates with free micro-balls according to the invention are housed in the compressor heads.

FIG. 6 is a three-dimensional exploded view of the reciprocating piston compressor similar to the one shown in FIG. 5, but from another angle of view which allows the opposite side of the valve plates with free micro-balls according to the invention to be observed.

FIG. 7 is a three-dimensional cross-sectional view of the valve plate with free micro-balls according to the invention as provided for at the inlet of the first compression stage of the reciprocating piston compressor shown in FIGS. 3 to 6.

FIG. 8 is a three-dimensional exploded view of the valve plate with free micro-balls according to the invention as provided for at the inlet of the first compression stage of the reciprocating piston compressor shown in FIGS. 3 to 6.

FIG. 9 is a three-dimensional view of the valve plate with free micro-balls according to the invention as provided for at the outlet of the first compression stage of the reciprocating piston compressor shown in FIGS. 3 to 6.

FIG. 10 is a schematic cross-sectional view of the valve plate with free micro-balls according to the invention, according to a simple variant comprising a single micro-ball only and which discharge passageway is formed of three axial discharge grooves arranged in the inner wall of the guide cylindrical orifice.

FIG. 11 is a schematic cross-sectional view of the variant of the valve plate with free micro-balls according to the invention, shown in FIG. 10, along to the A-A cross-section line.

DESCRIPTION OF THE INVENTION

FIGS. 1 to 11 show the valve plate 1 with free micro-balls according to the invention, various details of its components, variants, and accessories.

As shown clearly and simply in FIGS. 1 and 2, the valve plate 1 with free micro-balls according to the invention separates an upstream volume 3 from a downstream volume 4, and allows a fluid 2 to flow from said upstream volume 3 to said downstream volume 4 but not in the reversed direction.

FIGS. 1 to 8 and 10 show that the valve plate 1 with free micro-balls according to the invention includes at least one fixed circulation plate 5 which sealingly separates the upstream volume 3 from the downstream volume 4, said plate 5 being crossed right through in the direction of its thickness by at least one circulation orifice 6 through which the fluid 2 can flow.

It can also be seen from said figures that the end of said orifice 6 which emerges in the downstream volume 4 has a micro-ball seat 7, the other end of said orifice 6 emerging in the upstream volume 3, for example via a convergent inlet orifice 26 which facilitates the entry of the fluid 2 into the circulation orifice 6 and increases the discharge coefficient of the latter.

It is noted that the circulation plate 5 can be made of steel which is advantageously hard and mechanically resistant, or of any other material whatever its nature.

The valve plate 1 with free micro-balls according to the invention also comprises at least one permeable guide plate 9 fixedly housed in the downstream volume 4 parallel to the circulation plate 5 and close to the latter, said plate 9 being crossed right through in the direction of its thickness by at least one guide cylindrical orifice 10 whose longitudinal axis is centered on that of the micro-ball seat 7 more or less precisely, and without necessarily being completely parallel to the latter.

It is noted that the permeable guide plate 9 can be made of a plastic material appreciable for its lightness and its low cost of manufacture, or be made of any other material and in particular of sintered steel.

It is also noted that the permeable guide plate 9 can be precisely positioned relative to the circulation plate 5, for example by means of centering pins known per se, or by means of any other mechanical centering element and/or positioning.

It is noted in FIGS. 1, 2, 8, 10 and 11 that the valve plate 1 with free micro-balls according to the invention also comprises at least one micro-ball 8 housed with small play inside the guide cylindrical orifice 10 said small play limiting the passage of fluid 2 via the gap left between said micro-ball 8 and said cylindrical orifice 10, said micro-ball 8 being capable to move in longitudinal translation in said cylindrical orifice 10 so as to either rest in a sealed manner on the micro-ball seat 7 in order to close the circulation orifice 6 and prevent the flow of the fluid 2 in said orifice 6, or be distant from said seat 7 to allow said fluid 2 to circulate in said orifice 6.

It is noted that the radial play left between the micro-ball 8 and the guide cylindrical orifice 10 must be sufficiently small for said micro-ball 8 to act as a piston in the guide cylindrical orifice 10, but sufficiently large for said micro-ball 8 to be capable to move freely in said orifice 10, including under the effect of a small pressure difference.

In this respect, it can be seen that the principle of displacement of the micro-ball 8 in the guide cylindrical orifice 10 is analogous to that which governs the displacement of a projectile in a blowpipe, or of a bullet in the barrel of a rifle.

It is noted in FIGS. 1 to 10 that the valve plate 1 with free micro-balls according to the invention comprises at least one permeable micro-ball stop abutment 11 which is directly or indirectly integral with the guide cylindrical orifice 10 and which fixes the maximum distance which separates the micro-ball 8 from the micro-ball seat 7 when said micro-ball 8 is in contact with said stop abutment 11.

It is noted that the permeable micro-ball stop abutment 11 only slightly or not at all obturates the guide cylindrical orifice 10 so that the pressure difference between that prevailing in the downstream volume 4 and that prevailing in the upstream volume 3 can exert the desired blowpipe effect on the micro-ball 8, either to keep the latter pressed against the micro-ball seat 7 with which it cooperates, or, on the contrary, to move said micro-ball 8 away from said seat 7 so as to allow the fluid 2 to circulate in the circulation orifice 6.

It can be seen in FIGS. 1, 2, 8 and 10 that the valve plate 1 with free micro-balls according to the invention comprises at least one spacer 12 interposed between the permeable guide plate 9 and the circulation plate 5.

The spacer 12 keeps the permeable guide plate 9 at a distance from the circulation plate 5 such that, when the micro-ball 8 is in contact with the micro-ball seat 7, at least a portion of the volume of said micro-ball 8 remains accommodated inside the guide cylindrical orifice 10, regardless of any chamfer or flare that said guide cylindrical orifice 10 may have.

It is noted—particularly in FIG. 2—that when the micro-ball 8 is in contact with the micro-ball stop abutment 11, a passage is left for the fluid 2 to flow, on the one hand, between said micro-ball 8 and the micro-ball seat 7 with which it cooperates and, on the other hand, between the permeable guide plate 9 and the circulation plate 5.

It is noted that the spacer 12 can be made integral either with the circulation plate 5 or with the permeable guide plate 9 as shown in FIG. 10, or with both, particularly if said spacer 12, said plate 5, and said plate 9 form one and the same piece of metal or any other material.

The spacer 12 may also be constituted by a separate mechanical part, or be part of the environment in which the valve plate 1 with free micro-balls according to the invention is integrated.

Finally, as illustrated in FIGS. 1 to 10, the valve plate 1 with free micro-balls according to the invention comprises at least one discharge passageway 13 which passes right through the permeable guide plate 9 and/or which bypasses said plate 9, said passageway 13 allowing the fluid 2, when the micro-ball 8 is not resting on the micro-ball seat 7, to flow from the upstream volume 3 to the downstream volume 4 via the circulation orifice 6.

It is noted that the play left between the micro-ball 8 and the guide cylindrical orifice 10 contributes to allow the fluid 2 to flow from the upstream volume 3 to the downstream volume 4.

It is noted in FIGS. 1 to 10 that the permeable micro-ball stop abutment 11 can be constituted by a micro-ball bearing area 16 which is positioned in the extension of the guide cylindrical orifice 10 and which is arranged on a stopper plate 14 fixedly housed in the downstream volume 4 parallel to the permeable guide plate 9 and close to the latter.

In this case, a discharge passageway 15 passes right through the stopper plate 14 in the direction of its thickness and/or bypasses the stopper plate 14 to allow fluid 2 to flow from upstream volume 3 to downstream volume 4 through circulation orifice 6 when micro-ball 8 does not rest on the micro-ball seat 7.

If this is the configuration of the valve plate 1 with free micro-balls according to the invention, as shown in FIGS. 1 and 2, a stopper plate spacer 17 can be interposed between the stopper plate 14 and the permeable guide plate 9 in such a way as to keep said stopper plate 14 at a distance from said plate 9 such that when the micro-ball 8 is in contact with the micro-ball bearing area 16, at least part of the volume of said micro-ball 8 remains accommodated inside the guide cylindrical orifice 10.

It is noted that the stopper plate spacer 17 can be made integral either with the stopper plate 14 or the permeable guide plate 9, or both, if said spacer 17, said stopper plate 14, and said plate 9 form one and the same piece of metal or any other material.

The stopper plate spacer 17 may also be a separate mechanical part as shown in FIGS. 1 and 2, or may be part of the environment in which the valve plate 1 with free micro-balls according to the invention is incorporated.

FIGS. 1 to 7 and FIG. 9 show that the circulation plate 5, the permeable guide plate 9, the permeable micro-ball stop spacer 11 and the spacer 12 may constitute a rigid assembly 19 formed by screwing, welding, crimping or by any means of assembly known to the persons skilled in the art, the micro-ball 8 being housed in said assembly 19.

In this case, and as shown in FIGS. 4 to 6, the rigid assembly 19 may be advantageously sealingly housed in an assembly recess 20 which separates the upstream volume 3 from the downstream volume 4, the rigid assembly 19 or the assembly recess 20 comprising at least one gasket groove 21 in which a gasket 22 is fitted.

According to this particular arrangement of the valve plate 1 with free micro-balls according to the invention, as shown in FIGS. 1, 2 and 10, the assembly recess 20 may have an upstream volume 23-side axial stop abutment on which the rigid assembly 19 rests directly, and a downstream volume 24-side axial stop abutment on which the rigid assembly 19 rests by means of an assembly retaining spring 25, the latter bearing on the downstream volume 24-side axial stop abutment to press the assembly recess 20 on the upstream volume 23-side axial stop abutment.

It is noted that advantageously, the force exerted by the assembly retaining spring 25 on the rigid assembly 19 is greater than the force exerted by the fluid 2 on said rigid assembly 19 when the pressure prevailing in the upstream volume 3 is greater than that which prevails in the downstream volume 4 and that consequently, the micro-ball 8 is kept away from the micro-ball seat 7 with which it cooperates, the fluid 2 flowing from the upstream volume 3 to the downstream volume 4.

It is to be noted in FIGS. 10 and 11 that according to a variant of the valve plate 1 with free micro-balls according to the invention, the discharge passageway 13 may be formed of at least one axial discharge groove 27 formed in the internal wall of the guide cylindrical orifice 10, the latter retaining its ability to guide the micro-ball 8 with low radial play during the movement of said micro-ball 8 in said orifice 10.

Operation of the Invention

The operation of the valve plate 1 with free micro-balls according to the present invention is easily understood in view of FIGS. 1 to 11.

To facilitate understanding, there has been shown in FIGS. 1 and 2 a valve plate 1 with free micro-balls according to the invention provided with a single micro-ball 8, although the purpose of said valve plate 1 is to include a large number of micro-balls 8 as shown in FIGS. 3 to 9.

In FIGS. 1 and 2, the pressure prevailing in the upstream volume 3 is denoted "P1", while the pressure prevailing in the downstream volume 4 is denoted "P2".

FIG. 1 illustrates what happens when P2 is greater than P1. In this case, the micro-ball 8 is pressed by P2 on the micro-ball seat 7 provided at the end of the circulation orifice 6, the latter crossing the circulation plate 5 right through in the direction of the thickness of this plate.

In FIG. 1, the micro-ball 8 forms with the micro-ball seat 7 a tight contact line which opposes the flow of fluid 2 from the downstream volume 4 to the upstream volume 3.

FIG. 2 illustrates what happens when P1 is greater than P2. As can be seen in said figure, under the pressure of P1, the micro-ball 8 has moved in the guide cylindrical orifice 10 in which it is housed until it comes into contact with the permeable micro-ball stop abutment 11. It is noted that the guide cylindrical orifice 10 is arranged in the permeable guide plate 9, As seen in FIG. 2, the micro-ball 8 behaved like a bullet in the barrel of a gun, the function of the latter being devolved to the guide cylindrical orifice 10 in which said micro-ball 8 is housed with small play. As another analogy, the micro-ball 8 also behaved like a projectile propelled into the tube of a blowpipe by air pressure, the function of said tube also being fulfilled by the cylindrical orifice guide 10.

In FIG. 2, P1 being greater than P2, the fluid 2 flows from the upstream volume 3 to the downstream volume 4, passing successively through the circulation orifice 6 in the passage left between the micro-ball 8 and the micro-ball seat 7, in the space left between the permeable guide plate 9 and the circulation plate 5 by the spacer 12, and in the discharge passageway 13 which passes right through the permeable guide plate 9. It is noted that the micro-ball 8 is kept away from its micro-ball seat 7 by the flow of fluid 2.

According to the particular configuration of the plate valve 1 with free micro-balls according to the invention shown in FIGS. 1 and 2, after having crossed the discharge passageway 13, the fluid 2 joins the downstream volume 4 after having passed through a space left between a stopper plate 14 which presents the permeable micro-ball stop abutment 11 and the permeable guide plate 9, and after having passed a discharge passageway 15 which crosses the stopper plate 14 right through in the direction of its thickness.

It is noted in FIGS. 1 and 2 that the space between the stopper plate 14 and the permeable guide plate 9 results from a stopper plate spacer 17 interposed between said stopper plate 14 and said plate 9.

However, the purpose of the valve plate 1 with free micro-balls according to the invention is not to be provided with a single micro-ball 8 but with a large number of micro-balls 8 operating over a short stroke, in order to be capable to meet the needs and expectations of reciprocating piston compressors 52 produced in small, medium and large series.

The interest in providing the valve plate 1 with free micro-balls with a large number of micro-balls 8 is understood when it is reminded that the circumference of a ball grows proportionally to its diameter, that the projected section of said ball grows as a function of the square of its diameter, wherein the volume of said ball grows as a function of the cube of its diameter.

Thus, the smaller the ball, the greater the quotient of its projected section divided by its volume.

Consider a solid steel ball. The smaller the ball, the smaller its mass relative to its projected section. In other words, the smaller the ball, the less mass of steel per unit of projected section.

Let us now assume that said steel ball is housed in a cylinder in which it can move approximately tightly like a lead bullet in a gun barrel.

If said ball is accelerated by a pressure difference prevailing on each side of the approximately tight contact line that said ball forms with said cylinder, for a same pressure difference, the smaller said ball is, the greater the acceleration to which it is subjected.

This first observation explains why, when the valve plate 1 with free micro-balls is applied to a reciprocating piston compressor 52 as shown in FIGS. 3 to 6, said valve plate 1 comprises a multitude of micro-balls 8, each housed in a guide cylindrical orifice 10.

The low weight of said micro-balls 8 avoids the need for a return spring to bring said micro-balls 8 back into contact with the micro-ball seat 7 on which they rest, and to prevent the fluid 2 from flowing from the downstream volume 4 to the upstream volume 3.

Indeed, when the pressure prevailing in the upstream volume 3 is different from that prevailing in the downstream volume 4, since said micro-balls 8 are housed with a small play inside the guide cylindrical orifice 10, the acceleration undergone by said micro-balls 8 is high thanks to their low mass in relation to their projected section.

Thus, said micro-balls 8 can move very quickly from their micro-ball seat 7 to their permeable micro-ball stop abutment 11 and vice versa, without allowing a "back flow" to be established at the time of their closure such that it could significantly reduce the total efficiency of the reciprocating piston compressor 52 which is equipped with the valve plate 1 with free micro-balls according to the invention.

Thus, due to the operation of the micro-balls 8 translating in their guide cylindrical orifice 10, which is similar to that of a projectile in a blowgun, it is not necessary to provide a return spring such as is usually included in passive compressor valves according to the state of the art.

The absence of a return spring gives the valve plate 1 with free micro-balls according to the invention a great reactivity because the micro-balls 8 open under a very small pressure difference to allow the fluid 2 to pass from the upstream volume 3 to the downstream volume 4. This feature is favorable to the volumetric and energy efficiency of the reciprocating piston compressor 52 which receives said valve plate 1.

Indeed, unlike passive compressor valves with return springs according to the state of the art, the valve plate 1 with free micro-balls according to the invention does not have a threshold pressure imposed by any return spring, at which the micro-balls 8 lift from their micro-ball seat 7 to allow the fluid 2 to flow between the upstream volume 3 and the downstream volume 4.

In addition, keeping the micro-balls 8 open in contact with their permeable micro-ball stop abutment 11 does not require overcoming any return spring force and therefore does not produce any loss of load due to the action of a spring.

Indeed, once said micro-balls 8 pressed on said abutment 11, the circulation of fluid 2 through the passageway left between said micro-balls 8 and their micro-ball seat 7 does not have to counter any antagonistic effort that would be exerted on said micro-balls 8 by a return spring.

Abrasive wear usually occurring in the contact area between the return springs and the valve with which they cooperate on the one hand, and between the return springs and their housings on the other hand, is also non-existent in the context of the valve plate 1 with free micro-balls according to the invention, since the invention does not provide for a return spring.

It is to be noted that the reactivity of micro-balls 8 to open and close can be adjusted by the pass-through section left to fluid 2 to bypass said micro-balls 8, that is, the pressure drop constituted by the circuit of fluid 2 between the micro-ball seat 7 and the downstream volume 4.

Said reactivity can also be regulated by the pressure drop that forms the fluid circuit 2 which connects the face of the micro-balls 8 opposite to the micro-ball seat 7, and the downstream volume 4.

FIGS. 1 to 11 show, as an example, micro-balls 8 resting on a conical micro-ball seat that forms an angle of forty-five degrees on either side of its axis. According to this non-limiting example, the micro-balls 8 are made of solid steel and their diameter is two millimeters.

The inner diameter of the circulation orifice 6 with which the micro-balls cooperate is one point thirty-four millimeters, and the width of the support wall of the micro-ball seat 7 is one tenth of a millimeter. Contact is established between each micro-ball 8 and their respective micro-ball seat 7 in the middle of said support wall, and normally at the latter. A radial play of three hundredths of a millimeter is left between each micro-ball 8 and the guide cylindrical orifice 10 that houses it.

According to the examples shown in FIGS. 1 to 11, each micro-ball 8 was allowed a maximum stroke of four tenths of a millimeter. Said stroke corresponds to the distance that said micro-ball 8 must travel to go from its contact with its micro-ball seat 7 to its contact with its permeable micro-ball stop abutment 11, and vice versa.

When said micro-ball 8 is in contact with its permeable micro-ball stop abutment 11, a useful section of approximately one point six square millimeter is left for the fluid 2 to pass between said micro-ball 8 and the micro-ball seat 7 with which it cooperates.

It is to be noted that according to the particular configuration of the valve plate 1 with free micro-balls according to the invention shown in FIGS. 1 to 11, when the micro-ball 8 is subjected to a pressure difference of one hundred millibars between its upper and lower face, said micro-ball 8 takes a little less than a millisecond to move from its contact with the micro-ball seat 7 to its contact with the permeable micro-ball stop abutment 11, or vice versa.

It is noted that under these conditions, the speed acquired by the micro-ball 8 when it comes into contact with the micro-ball seat 7 or the permeable micro-ball stop abutment 11 is of the order of eighty centimeters per second.

This speed is lower than that acceptable maximum for a valve of reciprocating internal combustion engine when said valve comes into contact with the seat with which it cooperates. Thus, said speed of eighty centimeters per second guarantees the durability of the micro-ball seat 7 on the one hand, and of the micro-ball 8 on the other hand.

It is also noted that the friction between the micro-ball 8 and the interior of the guide cylindrical orifice 10 dissipates a very low energy by friction, even if the guide cylindrical orifice 10 is positioned horizontally and therefore, perpendicular to the direction of gravity. Indeed, the weight of the micro-ball 8 is, according to the non-limiting examples shown in FIGS. 1 to 11, only thirty-four milligrams, a film of air tending to interfere between each micro-ball 8 and the guide cylindrical orifice 10 which accommodates it when said micro-ball 8 moves.

It is noted that the low maximum speed acquired by the micro-balls 8 and the low weight of the latter gives a low unit kinetic energy of about thirty-four micro-Joules to be dissipated at the interface between each micro-ball 8 and its micro-ball seat 7, or between each micro-ball 8 and its permeable micro-ball stop abutment 11.

The width of the micro-ball seat 7 and the low kinetic energy to be dissipated on said seat guarantee the durability of the steel micro-balls 8 and of the micro-ball seat 7 also made of steel with which they cooperate.

It is noted that the micro-balls 8 may be similar to the balls ordinarily used in ball bearings known per se, that is to say tenaciously hardened, and possibly coated with a hard chrome plating. The cost of manufacturing such balls being very low, it contributes to the low cost of the valve plate 1 with free micro-balls according to the invention.

It is to be noted also that, provided the micro-balls 8 are not linked to a spring, they can freely rotate on themselves to never expose the micro-ball seat 7 exactly the same surface. This allows each micro-ball 8 to evacuate any impurities or particles that might come between itself and the micro-ball seat 7 with which it cooperates, and to permanently clean its entire outer surface.

It will also be noted that the spherical shape of the micro-balls 8 is conducive to the flow of the fluid 2. Indeed, before opening into the downstream volume 4 and after having passed through the circulation orifice 6, said fluid 2 coming from the upstream volume 3 must pass through the annular space left between each micro-ball 8 and its micro-ball seat 7. Yet, when the fluid 2 meets the dome formed by said micro-ball 8, said fluid 2 is naturally channeled towards said seat 7 by said dome, which gives the valve plate 1 with free micro-balls according to the invention a high discharge coefficient.

It should also be noted that the bearing surface of each micro-ball 8 on its micro-ball seat 7 is large relative to the volume of said micro-ball 8. As a result, said micro-ball 8 can effectively cool on its micro-ball seat 7 to adopt a temperature close to that of said seat 7.

It should also be noted that since each micro-ball 8 is perfectly spherical and rotates on itself when it is in operation, said micro-ball 8 cannot undergo any inhomogeneous deformation related to temperature.

As can be readily seen in FIGS. 3 to 6, when it comprises many micro-balls 8, the valve plate 1 with free micro-balls according to the invention has a large surface area relative to the volume of the compression chamber 51 which it serves.

As can be understood from the foregoing, within the limits of reason, said surface must comprise small and numerous micro-balls 8.

Indeed, if the same surface is covered with micro-balls 8, the sum of the lengths of the lines of contact that said micro-balls 8 form with their seat 7 is all the greater as the number of micro-balls 8 is greater. Moreover, the smaller the micro-balls 8 are, the smaller their lift in absolute terms at the same ratio between lift and diameter of circulation orifice 6.

Let us take for example a square of ten millimeters on a side.

In this square, we can accommodate a ball of ten millimeters in diameter, or reasonably, sixteen micro-balls 8 of two millimeters in diameter. However, the total length of the lines of contact formed by the micro-balls 8 of two millimeters in diameter is three point two times greater than the length of the line of contact formed by the ball of ten millimeters in diameter. Thus, with the same passage section left to the fluid 2 to flow from the upstream volume 3 to the downstream volume 4, the stroke of the two-millimeter micro-balls 8 is three point two times smaller than that of the ball of ten millimeters in diameter.

One can also consider what happens when, in order to obtain a comparable result in terms of passage section and the same duration of the opening/closing maneuver, one uses a ball of ten millimeters in diameter instead of sixteen micro-balls 8 of a diameter of two millimeters.

In order to leave the same passage section for the fluid 2, the lift of the ball of ten millimeters in diameter must be one point twenty-eight millimeters and not four tenths of a millimeter for the micro-balls 8 of two millimeters in diameter.

Given the mass of the ball of ten millimeters in diameter on the one hand, and given the unfavorable ratio between projected section and volume of said ball on the other hand, in order to impart to the latter the necessary acceleration to travel one point twenty-eight millimeter stroke in the same time as that left to the two millimeter diameter micro-balls 8 to travel four tenths of a millimeter, it is necessary to subject said ball of ten millimeters in diameter to a pressure difference of one point seven bar instead of only one hundred millibars for the micro-balls 8. That is, seventeen times more.

Moreover, under these conditions, the velocity of the ball of ten millimeters in diameter for resting on its seat would be two point nine meters per second. In addition to producing high acoustic emissions, said velocity would give said ball and seat a short life, incompatible with that of most reciprocating piston compressors 52.

It may also be noted that once the ball of ten millimeters in diameter contacts its opening stop abutment, it would have to be subjected to a reverse pressure differential of also one point seven bar to return said ball to its seat in the allotted time, which would annihilate the volumetric efficiency of the reciprocating piston compressor 52 due to the excessive "back flow" resulting from such a said pressure differential.

Because of the high maximum velocity acquired by the ball of ten millimeters in diameter and the weight of four point two grams of the latter, the kinetic energy to be dissipated at the interface between said ball and its seat, or between said ball and its opening stop abutment, would be seventeen thousand four hundred microjoules instead of the thirty-four microjoules dissipated by each micro-ball 8 of two millimeters in diameter. More than five hundred times more to dissipate on a seat with only five times more contact surface, i.e. more than one hundred times more kinetic energy per unit of surface.

For this reason, the valve plate 1 with free micro-balls according to the invention is designed to operate with small micro-balls 8 distributed in large numbers over the greatest possible part of the available surface offered by said valve plate 1, the flow rate of each micro-ball 8 being added to that of its neighbors.

Providing a large number of micro-balls 8 in place of larger balls also has the advantage of a smaller dead volume inside the valve plate 1 with free micro-balls according to the invention.

This makes it possible to produce reciprocating piston compressors 52 with a volumetric ratio that remains high enough to give them an acceptable volumetric efficiency.

Equipped with micro-balls 8 of small diameter, the valve plate 1 with free micro-balls according to the invention can indeed be designed to be thin and leaving little dead volume. As such, FIGS. 3 to 9 show only seven-millimeters-thick valve plates with free micro-balls which, as shown in FIGS. 3 to 6, can be easily integrated into a compact three-stage reciprocating piston compressor 52 that can be contained in a cube of less than fifteen centimeters on the side.

As soon as it includes valve plate 1 with free micro-balls according to the invention, such a compressor 52 becomes particularly suitable for the implementation of the ignition prechamber with valve subject to the patent FR 3,061,743 published on 16 Aug. 2019 and belonging to the applicant.

Indeed, in addition to its compactness and permeability, the valve plate 1 with free micro-balls according to the invention adapts to the variable speed of an automotive internal combustion engine which can change from five hundred revolutions per minute to more than six thousand five hundred revolutions per minute, without damage to the performance of the reciprocating piston compressor 52, its acoustic emissions or its durability.

This is due in particular to the fact that micro-balls 8 do not have a spring and therefore do not have a proper mode related to the spring, and that said micro-balls 8 have a low inertia.

Designed to implement the ignition prechamber with valve subject of patent No. FR 3,061,743, the compact, three-stage reciprocating piston compressor 52 shown in FIGS. 3 to 6 runs at half the speed of the thermal engine, i.e. from a minimum of two hundred and fifty revolutions per minute, to a maximum of just over three thousand revolutions per minute.

It can be seen in FIGS. 3 to 6 that said compressor 52 comprises inlet valves 57 and discharge valves 58, said valves 57, 58 consisting of a valve plate 1 with free micro-balls according to the invention.

It is to be noted that said compressor 52 comprises compressor pistons 60 which each can move in translation in a compressor cylinder 56, said pistons 60 forming, with a crank shaft 61, a crank-frame system 59 better known as the Anglo-Saxon term of "scotch yoke". By way of non-limiting example, the stroke of the compressor pistons 60 is here seventeen millimeters.

Thus constituted, the reciprocating piston compressor 52 shown in FIGS. 3 to 6 is particularly suited to the implementation of the ignition prechamber with valve which is the subject of patent No. FR 3,061,743.

Said compressor 52 comprises a first compression stage 62 consisting of two compressor cylinders 56 of fifty-three millimeters of bore sucking air from a common intake duct 53, and delivering said air to a higher pressure in a common delivery duct 54.

Said compressor 52 also comprises a second compression stage 63 consisting of a compressor cylinder 56 of forty millimeters in diameter, and a third compression stage 64 consisting of a compressor cylinder 56 of twenty-two millimeters in diameter.

Note, particularly in FIGS. 3 and 5, the air-water intercooler 65 which cools the air from the first compression stage 62 before said air is admitted by the second compression stage 63.

Note, particularly in FIGS. 3 and 6, the air-water intercooler 65 which cools the air from the second compression stage 63 before said air is admitted by the third compression stage 64.

Also to be noted in FIGS. 4 to 6 are the cooling water chambers 66 in which circulates water at a temperature of the order of forty degrees Celsius, said water coming from a pump not shown.

The cooling water chambers 66, on the one hand, cool the air which circulates in the air-water intercoolers 65 and, on the other hand, the oil contained in a compressor casing 67 in which are arranged the compressor cylinders 56, said casing 67 in particular housing the crank-frame system 59. The function of said oil is to lubricate the internal mobile mechanical components of the reciprocating piston compressor 52 in addition to cooling them and homogenizing the temperature thereof.

Note in FIGS. 3 to 6 the compressor heads 55 which close the ends of the compressor cylinders 56 to form compression chambers 51.

The compressor heads 55 are made in two parts, the first sealingly housing the valve plate 1 with free micro-balls according to the invention, and the second forming the inlet duct 53 and the discharge duct 54 of the corresponding compression stage 62, 63, 64.

As can be seen clearly in FIG. 4, the valve plates 1 with free micro-balls are fixed to the second part of the compressor heads 55 by plate fixing screws 70, and kept at a distance of three millimeters from said second part by a spacing washer 71.

It can also be seen, particularly in FIGS. 7 and 8, that the circulation plate 5, the permeable guide plate 9, and the stopper plate 14, as integrated in the reciprocating piston compressor 52 shown in FIGS. 3 to 6 are positioned relative to each other by locating pins 72 which cooperate with assembly screws 68 to clamp said circulation plate 5, said plate 9 and said stopper plate 14 together before their assembly in said compressor 52, this after having placed the micro-balls 8 and the spacers 12 which here take the form of washers inserted between the circulation plate 5 and the permeable guide plate 9.

Thus pre-assembled, the valve plate 1 with free microballs form a ready-to-assemble assembly already provided or not with a seal 22, said assembly being able, for example, to be delivered by an equipment manufacturer to the manufacturer of the reciprocating piston compressor 52 as shown in FIGS. 3 to 6.

Note in FIGS. 4 to 6 the connection sockets 69 which connect the intake ducts 53 and the discharge ducts 54 formed by the compressor heads 55 with the air-water intercoolers 65, said sockets 69 comprising sealing O-rings and being located axially with respect to the compressor casing 67 by abutments.

Thus, the valve plate 1 with free micro-balls according to the invention makes it possible to produce reciprocating piston compressors 52 that are efficient, durable, and compact, operating over a wide range of speed and pressure. In doing so, the valve plate 1 with free micro-balls according to the invention allows the implementation under optimal conditions of the ignition prechamber with valve subject of patent No. FR 3,061,743.

It should also be noted that the example of realization and context of the valve plate 1 with free micro-balls according to the invention which has just been described is non-limiting, as said valve plate 1 may be applied to fields other than that of compressors, such as that of motors, pumps, or any machine of any type which requires to let a gaseous or liquid fluid flow from an upstream volume to a downstream volume and not in the reversed direction, and this regardless of the nature of the gas or liquid used.

The possibilities of the valve plate 1 with free micro-balls according to the invention are not limited to the applications just described, and it must be understood that the foregoing description was given only as an example and that it in no way limits the field of said invention, which would not be left out by replacing the details of execution described by any other equivalent.

The invention claimed is:

1. Valve plate (1) with free micro-balls separating an upstream volume (3) from a downstream volume (4), and allowing a fluid (2) to flow from said upstream volume (3) to said downstream volume (4) but not in the reversed direction, characterized in that it comprises:
   At least one fixed circulation plate (5) which sealingly separates the upstream volume (3) from the downstream volume (4), said plate (5) being crossed right through in the direction of its thickness by at least one circulation orifice (6) in which the fluid (2) can flow, the end of said orifice (6) which emerges in the downstream volume (4) having a micro-ball seat (7);
   At least one permeable guide plate (9) fixedly accommodated in the downstream volume (4) parallel to the circulation plate (5) and close to the latter, said plate (9) being crossed right through in the direction of its thickness by at least one guide cylindrical orifice (10), the longitudinal axis of which being centred on that of the micro-ball seat (7);
   At least one micro-ball (8) accommodated with small play inside the guide cylindrical orifice (10), said small play limiting the passage of fluid (2) through the gap left between said micro-ball (8) and said cylindrical orifice (10), said micro-ball (8) being capable to move in translation longitudinally in said cylindrical orifice (10) so as to either sealingly rest on the micro-ball seat (7) in order to close the circulation orifice (6) and to prohibit the flow of the fluid (2) in said orifice (6), or be distant from said seat (7) to allow said fluid (2) flow through said orifice (6);
   At least one permeable micro-ball stop abutment (11) that is directly or indirectly attached to the guide cylindrical orifice (10) and that sets the maximum distance between the micro-ball (8) and the micro-ball seat (7) when said micro-ball (8) is in contact with said stop (11), the latter closing only little or not the guide cylindrical orifice (10);
   At least one spacer (12) interposed between the permeable guide plate (9) and the circulation plate (5) so as to keep that plate (9) at a distance from said plate (5) such that when the micro-ball (8) is in contact with the micro-ball seat (7), at least part of the volume of said micro-ball (8) remains accommodated inside the guide cylindrical orifice (10), while when said micro-ball (8) is in contact with the micro-ball stop abutment (11), a passage is left to the fluid (2) to flow, on the one hand, between said micro-ball (8) and the micro-ball seat (7) with which it cooperates and, on the other hand, between the permeable guide plate (9) and the circulation plate (5);
   At least one discharge passageway (13) which passes right through the permeable guide plate (9) and/or which bypasses said plate (9), said passageway (13) allowing, when the micro-ball (8) is not resting on the micro-ball seat (7), the fluid (2) to flow from the upstream volume (3) to the downstream volume (4) via the circulation orifice (6).

2. Valve plate with free micro-balls according to claim 1, characterized in that the permeable micro-ball stop abutment (11) consists of a micro-ball bearing area (16) which is positioned in the extension of the guide cylindrical orifice (10) and which is arranged on a stopper plate (14) fixedly housed in the downstream volume (4) parallel to the permeable guide plate (9) and close to the latter, a discharge passageway (15) passing right through the stopper plate (14) in the direction of its thickness and/or bypasses the stopper plate (14) to allow fluid (2) to flow from the upstream volume (3) to the downstream volume (4) through the circulation orifice (6) when the micro-ball (8) is not resting on the micro-ball seat (7).

3. Valve plate with free micro-balls according to claim 2, characterized in that a stopper plate spacer (17) is interposed between the stopper plate (14) and the permeable guide plate (9) so as to keep the stopper plate (14) at a distance from said plate (9), such that when the micro-ball (8) is in contact with the micro-ball bearing area (16), at least part of the volume of the micro-ball (8) remains accommodated inside the guide cylindrical orifice (10).

4. Valve plate with free micro-balls according to claim 1, characterized in that the circulation plate (5), the permeable guide plate (9), the permeable micro-ball stop abutment (11) and the spacer (12) constitute a rigid assembly (19) in which the micro-ball is housed (8).

5. Valve plate with free micro-balls according to claim 4, characterized in that the rigid assembly (19) is sealingly housed in an assembly recess (20) which separates the upstream volume (3) from the downstream volume (4).

6. Valve plate with free micro-balls according to claim 5, characterized in that the assembly recess (20) has an upstream volume (23)-side axial stop abutment on which the rigid assembly (19) rests directly, and a downstream volume (24)-side axial stop abutment on which the rigid assembly (19) rests via an assembly-holding spring (25), the latter bearing on the downstream volume (24)-side axial stop abutment in order to press the assembly recess (20) against the upstream volume (23)-side axial stop abutment.

7. Valve plate with free micro-balls according to claim 1, characterized in that the discharge passageway (13) is formed by at least one axial discharge groove (27) arranged in the internal wall of the guide cylindrical orifice (10).

* * * * *